United States Patent [19]

Shukovsky et al.

[11] Patent Number: 5,314,596
[45] Date of Patent: May 24, 1994

[54] PROCESS FOR FABRICATING MAGNETIC FILM RECORDING HEAD FOR USE WITH A MAGNETIC RECORDING MEDIA

[75] Inventors: Harold B. Shukovsky, Framingham; Sharat Batra, Shrewsbury; Michael L. Mallary, Berlin, all of Mass.

[73] Assignee: Digital Equipment Corporation, Maynard, Mass.

[21] Appl. No.: 888,105

[22] Filed: May 26, 1992

Related U.S. Application Data

[62] Division of Ser. No. 546,280, Jun. 29, 1990, Pat. No. 5,157,570.

[51] Int. Cl.$^5$ ............................................. C23C 14/34
[52] U.S. Cl. ........................... 204/192.2; 204/192.15; 205/119; 427/131
[58] Field of Search ........... 209/192.15, 192.2, 192.26, 209/192.22; 427/128, 131, 1.62; 205/119

[56] References Cited

U.S. PATENT DOCUMENTS

| | | | |
|---|---|---|---|
| 4,402,801 | 9/1983 | Omata et al. | 205/119 |
| 4,436,593 | 3/1984 | Osborne et al. | 205/119 |
| 4,789,914 | 12/1988 | Ainslie et al. | 360/103 |
| 4,805,055 | 2/1989 | Wright | 360/106 |
| 4,837,648 | 6/1989 | Yamauchi | 360/103 |
| 4,944,805 | 7/1990 | Nakarishi | 204/192.2 X |
| 5,073,242 | 12/1991 | Hamilton | 204/192.2 X |
| 5,087,332 | 2/1992 | Chen | 204/192.2 X |

OTHER PUBLICATIONS

M. L. Mallary, "Conduction of Flux at High Frequencies in Permalloy Strips by Small-Angle Rotations", *Journal of Applied*, 57(1), Apr. 15, 1985.

M. L. Mallary, et al., "Frequency Response of Thin Film Heads with Longitudinal and Transverse Anisotropy", *IEEE Transactions on Magnetics*, vol. 26, No. 5, Sep., 1990.

M. L. Mallary, et al., "Three-Dimensional Transmission Line Model for Flux Conduction in Thin-Film Recording Heads", *Journal of Applied Physics*, 67(9), May 1, 1990.

*Primary Examiner*—Nam Nguyen
*Attorney, Agent, or Firm*—Cesari and McKenna

[57] ABSTRACT

A thin film magnetic recording head for high-density recording applications. The head includes a pole formed from at least two ferromagnetic material layers with one layer having high anisotropy ($H_k$) and low permeability ($\mu$), and the other layer having low $H_k$ and high $\mu$. The high $H_k$ layer provides the lower magnetic impedance flux path in the tip region and the low $H_k$ layer provides the lower magnetic impedance path in the yoke region of the head. A non-magnetic film may be disposed between the layers, with a thickness chosen to minimize domain flux coupling of the two magnetic layers, while allowing magnetic signal flux transfer between layers at an appropriate point between the tip and the yoke. The pole may be sculpted so that the low $H_k$ layer extends only partially into the tip region, or so that the high $H_k$ layer extends only partially into the yoke. Alternatively, the invention may use a laminated, high permeability layer and a homogeneous layer in place of the high $H_k$ and low $H_k$ layers.

19 Claims, 6 Drawing Sheets

TIP YOKE

PROCESS FOR FABRICATING MAGNETIC FILM RECORDING HEAD FOR USE WITH A MAGNETIC RECORDING MEDIA

This application is a division of U.S. patent application Ser. No. 546,280 filed Jun. 29, 1990, which issued as U.S. Pat. No. 5,157,570 on Oct. 20, 1992.

CROSS-REFERENCE TO RELATED APPLICATIONS

This invention relates to the following co-pending patent applications, all of which are assigned to the assignee of this application as of the date of filing:

"Laminated Poles for Recording Heads", Ser. No. 07/128,886, filed Dec. 4, 1987, which was continued as Ser. No. 07/410,028, filed on Sep. 20, 1989, now U.S. Pat. No. 5,108,837.

"Flux Spreading Thin Film Magnetic Device", Ser. No. 07/227,808, filed Jun. 28, 1988, now U.S. Pat. No. 5,089,334.

"Magnetic Devices with Enhanced Poles", Ser. No. 07/345,719, filed May 1, 1989, pending.

FIELD OF THE INVENTION

This invention relates generally to magnetic disk drives and particularly to the configuration of a thin film head which increases recording density and data transfer efficiency.

BACKGROUND OF THE INVENTION

A typical magnetic data recording device, such as a disk drive, includes a magnetic storage media, and a read/write head. The head is usually formed from two or more elongated pieces of a suitable ferromagnetic material such as a nickel iron (NiFe) alloy. The poles are joined at one end, called the yoke, and are separated by a precisely defined gap at the opposite end, called the tip. A wire coil is wrapped around the poles adjacent the yoke. During read and write operations, the head is positioned with the tip portion adjacent the disk; the coil provides a mechanism for driving magnetic flux into as well as sensing magnetic flux from the head.

In designing a disk drive it is generally desirable to increase the density of information recorded per unit area of disk media surface, as well as the data transfer rate and signal-to-noise ratio (SNR). These parameters are primarily determined by the specific electro-mechanical configuration of the head. For example, since the number of tracks per inch (TPI) available on a disk of a given size is determined by the width of the tip, it is desirable to keep the tip as narrow as possible. However, the yoke should be made as wide as possible, to encourage magnetic flux conduction between the poles and the coil. A wider yoke increases the available amplitude of the signal emanating from the head, and thus the number of bits per inch (BPI) recordable in a given track. Given these conditions, it is well known that the preferred head pole configuration has a narrow tip and a wide yoke.

However, other parameters must normally be considered to achieve maximum recording density. For example, a ferromagnetic pole can be fabricated to have an induced anisotropy axis of preferred magnetic orientation, or "easy axis". When this axis is oriented perpendicular to the direction of flux conduction, the flow of flux through the head can occur by the preferred process of rotation of the rest state of magnetization away from the easy axis. The preference for the material to remain magnetized in the easy axis direction is also referred to as the anisotropy field, $H_k$.

Unfortunately, reducing the width of the pole beyond a critical value results in the dominance of "edge closure domains" which are not oriented in the preferred direction. Therefore, these edge closure domains encourage flux conduction by domain wall motion along the outer walls of the pole. While this may actually facilitate flux conduction at low frequencies, at higher frequencies the magnetic permeability, or $\mu$ of the pole becomes unacceptably low. Furthermore, defects in the head material can perturb the conduction of magnetic flux along the domain walls, resulting in Barkhausen noise. Thus, the pole tip cannot be made too narrow without adversely affecting head performance.

One technique for minimizing the size of the edge closure domains and thus for reducing the size of the tip is to increase the $H_k$ of the pole material. Several other techniques are known for adjusting the $H_k$, such as adding cobalt to create an NiFeCo alloy; changing the proportion of Ni to Fe together with a change in the magneostrictive forces on the pole; or using other materials, such as cobalt zirconium (CoZr), cobalt zirconium neodymium (CoZrNd), iron nitride FeN, iron silica (FeSi), and the like.

A quite different concern arises with the yoke, however, which complicates the choice of a suitable $H_k$. In particular, the yoke is less susceptible to Barkhausen noise, since its wider path prevents the dominance of edge closure domains, and thus the yoke usually provides sufficient flux conductivity. Rather, the problem with the yoke usually is that the permeability, $\mu$, of the material is inversely proportional to its $H_k$. Having too low a $\mu$ limits the amount of flux conduction through the coil. Thus, it is generally believed that the $H_k$ of the pole material should be kept low in order to avoid adverse affects upon the overall head efficiency.

A further consideration is the thicknesses of the poles in the dimension parallel to the write track. Optimum pole thickness is dictated primarily by surface eddy currents which originate from variations in the applied or detected magnetic field as different sections of the disk rotate past the head. At high frequencies, the presence of eddy currents generally limits flux conduction to the extent of the surface effect or "skin depth". Since thicker poles generally provide greater material for conduction, the thicker the pole, the better the conductivity. However, increasing the pole thickness beyond about twice the skin depth can adversely affect the pole's frequency response.

To optimize the SNR, other parameters should also be considered in determining the pole thickness. For example, consider that any given head configuration can be modelled by an equivalent electrical circuit consisting of an ideal inductor having a series resistance, $R_s$, and a parallel resistance, $R_p$. In order to maximize the available SNR, the output signal level, and hence, $R_p$, must be as large as possible. Since $R_p$ is typically inversely proportional to the pole thickness, in order to achieve high $R_p$, the thickness must be minimized. Hence, a compromise must typically be made between maximum frequency operation and maximum SNR when choosing the pole thickness.

A higher $R_p$ can also be obtained by decreasing the $H_k$ of the pole material, but this conflicts with the need to increase $H_k$ to encourage maximum flux conduction through the tip, as previously mentioned.

One approach to resolving some of these design tradeoffs has been to use a pole formed from multiple laminations. Such multiple laminations inherently provide the desired domain structure, since flux paths are provided in parallel by the laminated layers. They also increase the $R_p$ of the pole for a given pole thickness.

However, fabrication of laminated poles involves a more complicated and expensive fabrication process, since the layers must be formed by slower, more precise processes. For example, this process typically requires sputtering a sheet deposit and then ion milling the pole form with a mask, rather than the less expensive electroplating through a mask. Additionally, any ion milling required to form the pole geometry has the adverse effect of side-wall redeposition. This means that the longer the ion milling time, the greater the chance that redeposited material will build up sufficiently to provide a short circuit path between layers, thereby unfavorably changing the electrical and magnetic properties of the head.

Further discussion of the tradeoffs in thin film head design and some suggested alternatives are discussed in the following papers.

Mallary, M., et al., "Frequency Response of Thin Film Heads with Longitudinal and Transverse Anisotropy", presented at the IEEE Conference on Magnetics in April, 1990.

Mallary, M., et al., "Three Dimensional Transmission Line Model for Flux Conduction in Thin Film Heads", presented at the 34th Annual Conference on Magnetism and Magnetic Materials (1989).

Mallary, M., and Smith, A. B., "Conduction of Flux at High Frequencies by a Charge Free Magnetization Distribution", IEEE Transactions on Magnetics, Vol. MAG-24, pp. 2374– (1988).

Mallary, M., "Conduction of Flux at High Frequencies in Permalloy Strips by Small-Angle Rotations", Journal of Applied Physics, Vol 57, pp 3953– (1985).

What is needed is a thin film magnetic recording head which provides the desired domain structure in the tip and good flux conduction in the yoke region to provide for maximum density recording at acceptable SNRs. The head should be easily fabricated with minimal use of ion milling.

SUMMARY OF THE INVENTION

The invention is a thin film magnetic recording head which includes a pole comprising two magnetic layers formed of ferromagnetic material, with one layer formed of a material having high $H_k$ and low $\mu$, and the other layer formed of a material having low $H_k$ and high $\mu$. The layers as decoupled in terms of near-field, or internal domain flux, so that the pole behaves are though they were positioned far apart. However, the two magnetic layers are coupled in terms of far field, or signal flux applied from external sources. As a result, the high $H_k$ layer provides the lower magnetic impedance path in the pole tip region, and the low $H_k$ layer provides the lower magnetic impedance path in the yoke region.

The $H_k$ of the layers can be selected by any suitable means. For example, both pole layers may be each be formed from nickel-iron-cobalt (NiFeCo) with the low $H_k$ layer being an $Ni_uFe_vCo_w$ alloy, and the high $H_k$ layer being an $Ni_xFe_yCo_z$ alloy. The proportions u, v, and w are then chosen to provide the desired low $H_k$, and x, y, z are chosen to provide the desired high $H_k$. However, the cobalt may be omitted entirely from the low $H_k$ layer, or other suitable ferromagnetic materials may be used, such as cobalt zirconium (CoZr), cobalt zirconium neodymium (CoZrNd), iron nitride FeN, iron silica (FeSi), and the like. The $H_k$ of the layers can also be adjusted by consideration of the magnetostrictive forces on the poles and selecting the proportion of Ni to Fe accordingly.

Alternatively, the two magnetic layers may include a high permeability layer extending through the pole region, and a homogeneous layer extending through the yoke. The laminated layer is composed of plurality of laminae formed from alternating films of magnetic conductive and magnetic insulating material.

In one embodiment, a non-magnetic, separation film or layer may be disposed between the two magnetic layers. The non-magnetic layer may be formed of a material which is both non-magnetic and electrically insulating, if desired. Its thickness is chosen to minimize domain flux coupling of the two magnetic layers, while allowing magnetic signal flux transfer via exchange coupling between layers at an appropriate point between the tip and the yoke.

In yet another embodiment, the yoke region is a sculpted (thickened) low $H_k$ layer, which extends only partially over the high $H_k$ layer, to further assist in providing the desired type of coupling between layers.

There are several advantages to the invention. It exhibits the preferred domain behavior in the tip region, namely, conduction by magnetization rotation via the high $H_k$ material. In addition, the low $H_k$ material in the yoke region provides both maximum flux spreading and high permeability.

The sculpted embodiment eliminates the need for using an non-magnetic layer in some applications.

If a laminated layer is used, it achieves suppression of eddy currents by means of small skin depth, while also providing high permeability, without the need to use high $H_k$ materials in the preferred domain structure in the pole-tip region.

Fabrication of the poles is relatively straightforward, with several process step variations depending upon the desired pole configuration. For example, to fabricate the lower half of the pole, a suitably thick (such as 2 $\mu$m) high $H_k$ layer is first deposited onto an appropriate substrate by plating through a mask onto a sputter-deposited seed layer. Next, a non-magnetic layer of about 500 angstroms (Å) thickness is sputtered onto the high $H_k$ layer, followed by sputtering a low $H_k$ seed layer. Additional low $H_k$ material is then plated through a mask onto the seed layer to complete a suitably thick low $H_k$ layer (such as 2 $\mu$m). The seed layer is then removed by etching.

In the sculpted embodiment, high $H_k$ material is plated through a mask onto a seed layer to form a layer that extends throughout the yoke but not into the pole tip region. The mask then stripped and the non-magnetic layer material and a seed layer of low $H_k$ material are vacuum-deposited. A second mask is formed that exposes the yoke and pole tip regions, and a low $H_k$ material layer is plated on top of the high $H_k$ material layer. The mask is then stripped and the seed and non-magnetic layers are etched away.

The laminated layer can be fabricated by alternately sputtering 500–1000 Å NiFeCo layers and ultra-thin 35–50 Å $Al_2O_3$ layers onto a substrate until a total thickness of about 1–2 $\mu$m is achieved. At this point, a thicker 150 Å $Al_2O_3$ layer is sputtered as the non-magnetic layer. Following this, a NiFeCo seed layer is sputtered, and subsequent plating of NiFeCo to a 2–4 μm total thickness completes the pole.

BRIEF DESCRIPTION OF THE DRAWINGS

The above and further advantages of the invention may be better understood by referring to the following description in conjunction with the accompanying drawings, in which:

FIGS. 2B–2E are cross sectional views of various embodiments of the lower pole taken along line 2—2 of FIG. 2A, with:

FIG. 2B showing the lower and upper magnetic material layers, and a middle non-magnetic layer of a three-layer embodiment, FIG. 2C showing a sculpted pole embodiment without a non-magnetic layer, FIG. 2D showing a sculpted pole embodiment, with a non-magnetic layer, and FIG. 2E showing a sculpted pole embodiment using overlapping layers;

FIGS. 3B–3E are cross sectional views of various embodiments of the lower pole taken along lines 3—3 of FIG. 3A, with;

FIG. 3B showing three layer embodiment having a laminated lower magnetic layer, middle non-magnetic layer, and upper homogeneous magnetic layer, FIG. 3C showing a sculpted pole embodiment without an non-magnetic layer, FIG. 3D showing a sculpted pole embodiment with an non-magnetic layer, and FIG. 3E showing a sculpted pole embodiment using overlapping layers;

DETAILED DESCRIPTION OF ILLUSTRATIVE EMBODIMENTS

Figure 1:
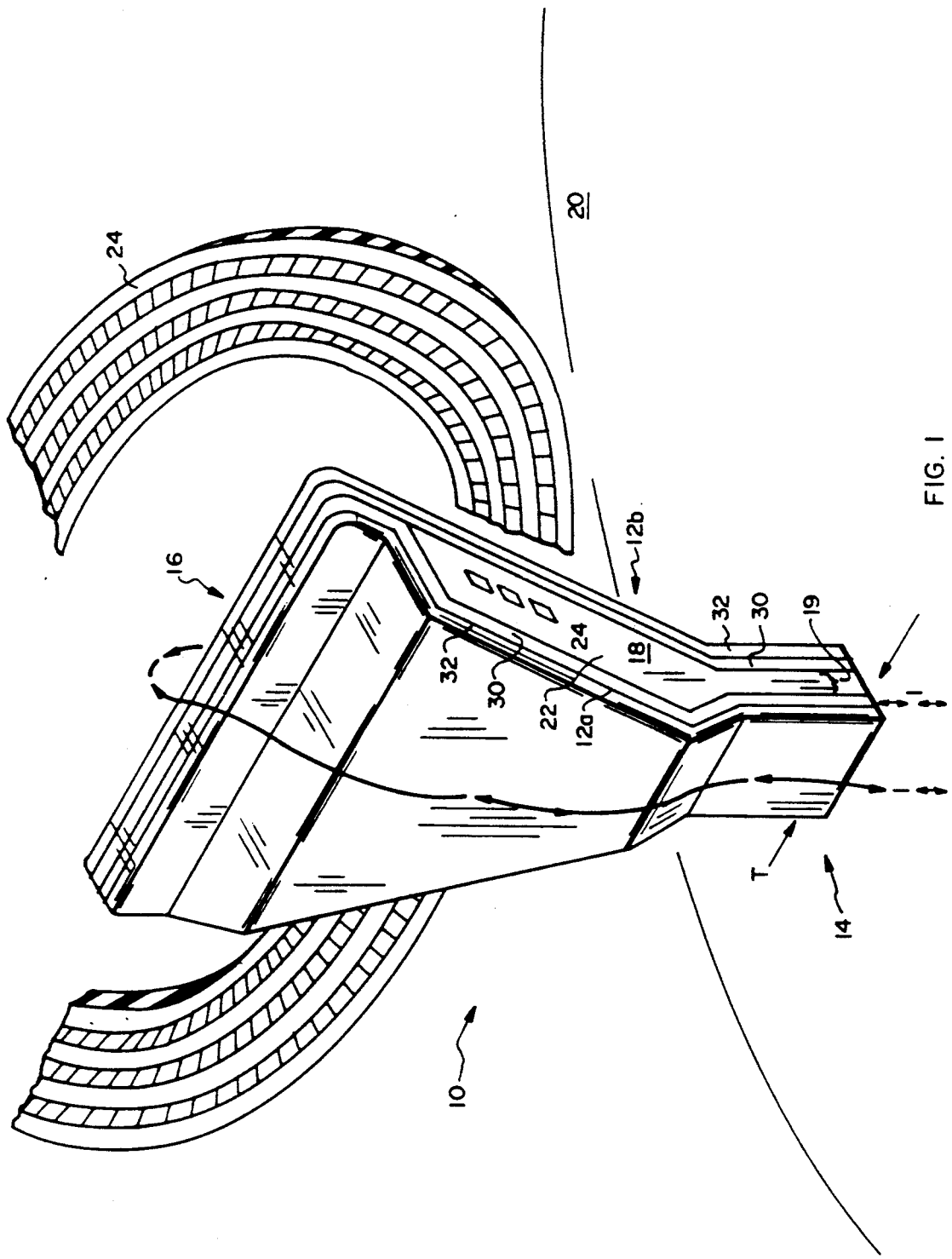
FIG. 1 is an isometric view of a two-pole thin film head according to the invention.

As shown in FIG. 1, a thin film magnetic head 10 in accordance with the invention includes an upper pole 12a and a lower pole 12b (collectively, "the poles 12"). The poles 12 are generally Y-shaped, and are formed from a ferromagnetic fluxconductive material, such as a nickel-iron-cobalt (NiFeCo) alloy. They are magnetically isolated at the narrow end, or tip 14, such as by mechanically spacing them apart. In addition, the poles 12 are magnetically coupled at the wide end, or yoke 16, such as by mechanically joining them.

The space between the poles 12 at the tip 14 is referred to as a gap 18, which is further defined by a rigid gap layer 19 disposed between the poles 12 and extending from the tip 14 to the yoke 16. The gap layer 19 is formed of a material which is both non-magnetic and electrically insulating, such as $Al_2O_3$.

A ridge 22 formed in the upper pole 12a allows the gap layer 19 to accommodate a plurality of coiled conductors 24 positioned between the poles 12. The conductors 24 serve to conduct electric current to and from the head 10. In addition, other configurations of the head 10 may include a third pole (not shown in the drawings) disposed between the upper pole 12a and lower pole 12b to form a second gap.

A magnetic media, such as a disk 20, is spaced opposite the poles 12 at the tip 14, and stores the recorded information. Other types of magnetic media may be used with the head 10, such as magnetic tape. During read operations, the head 10 is positioned with the tip 14 nearest the disk 20. As various sections of the disk 20 having different recorded polarizations pass by the tip 14, a magnetic flux travels around the head 10 in the direction of path I. This changing magnetic flux in turn induces an electric current in the conductors 24, which provides an electronic indication of the sensed magnetic field.

During write operations the process is reversed, with a current of either polarity being applied through the conductors 24. This creates a magnetic field in one direction or the other, along the path I, with sufficient strength to set the magnetization of a small portion of the disk 20 adjacent the tip 14.

A distinguishing feature of the invention is the way in which the poles 12 are constructed. In particular, the poles 12 are laminated from two or more layers, with each layer having specific characteristics. One embodiments of an exemplary pole 12b has a first ferromagnetic layer 30 formed of a high anisotropy ($H_k$) and low permeability ($\mu$) material such as $Ni_xFe_yCo_z$, and a second ferromagnetic layer 32 formed of a low $H_k$ and high $\mu$ material such as $Ni_uFe_vCo_w$. The proportions x, y, and z are chosen to provide the desired high $H_k$ in layer 30; similarly, u, v, and w are chosen to provide the desired low $H_k$ in layer 32.

The two layers 30 and 32 are decoupled in terms of internal domain flux, that is, the flux inherent in the domain structure of the pole. In other words, the two magnetic layers assume a domain pattern that is essentially the same as if they were very far apart from each other. However, layers 30 and 32 are coupled in terms of external signal flux, that is, the far-field flux applied to the pole by outside forces such as the coils 24 or the disk 20. It may also be said that the two layers are decoupled in terms of, or exchange coupling.

The high $H_k$ layer 30 is the path of least magnetic resistance in the tip 14, and the low $H_k$ layer 32 is the path of least magnetic resistance in the yoke 16.

As will be understood shortly, this provides the novel advantage of having the preferred domain structure in the tip 14, via the high $H_k$ material, as well as the preferred structure in the yoke 16 via the low $H_k$ material.

As shown in FIG. 1, the upper pole 12a also comprises a high $H_k$ layer 30 and a low $H_k$ layer 32. In the illustrated embodiment, the low $H_k$ layers 32 form the outer faces of the poles 12, and the high $H_k$ layers 30 form the inner faces adjacent the gap layer 19, but the layers may also be arranged in other orientations.

Figure 2A:
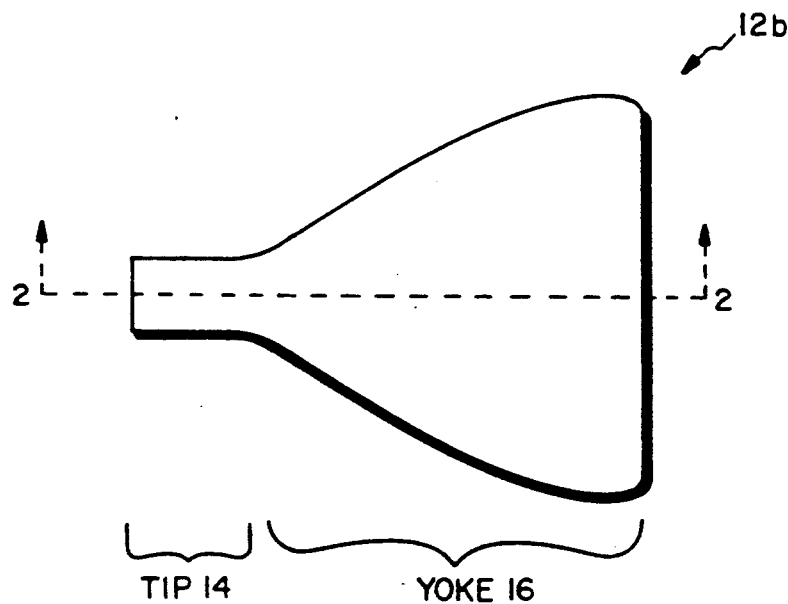
FIG. 2A is a plan view of the lower pole having a homogeneous high $H_k$ layer.

FIG. 2A is a plan view of the lower pole 12b showing in greater detail the general Y-shape and the approximate extent of the tip 14 and yoke 16.

Figure 2B:
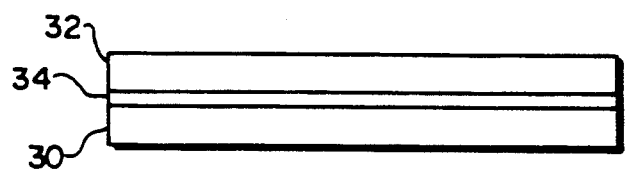

FIG. 2B is a cross sectional view of one embodiment of the lower pole 12b taken along lines 2—2 of FIG. 2A. The high $H_k$ layer 30 is preferably a homogeneously formed layer of ferromagnetic material having an intrinsically high $H_k$. For example, it may be a 2–4 μm thick layer of $Ni_xFe_yCo_z$, with the proportions x, y, and z chosen to provide the desired $H_k$ of approximately 10

Oersteds (oer). However, the exact thickness of the high $H_k$ layer 30 depends upon several other considerations. For example, if it is too thick, a pole tuning effect may occur, which adversely affects the shape of the electric signal pulse emanating from the coils 24, and the parallel resistance ($R_p$) of the pole may become too small. If the high $H_k$ layer is too thin, a lower electrical signal level results at the conductors 24.

The low $H_k$ layer 32 extends the entire length of the pole 12b, from the tip 14 to the yoke 16. The low $H_k$ layer 32 is typically a homogeneously formed $Ni_uFe_v$-$Co_w$ layer of about 2 μm thickness, with the proportions u, v, and w are chosen to provide the desired low $H_k$. However, the exact thickness of layer 32 is dictated by the desired parallel resistance, $R_p$, of the pole 12b, since this layer carries the flux through the yoke 16.

Those of skill in the art will recognize that there are various ways to provide layers having different $H_k$'s. For example, both pole layers may be each formed from nickel-iron-cobalt (NiFeCo) alloy, with the low $H_k$ layer being an $Ni_uFe_vCo_w$ alloy, and the high $H_k$ layer being an $Ni_xFe_yCo_z$ alloy. The cobalt may be omitted entirely from the low $H_k$ layer, i.e., w may be zero. Other suitable ferromagnetic materials may be used, such as cobalt zirconium (CoZr), cobalt zirconium neodymium (CoZrNd), iron nitride FeN, iron silica (FeSi), and the like. The $H_k$ of the layers can also be adjusted by consideration of the magnetostrictive forces on the poles and selecting proportion of Ni to Fe in the pole material accordingly.

In the embodiment of FIG. 2B, a non-magnetic layer 34 is sandwiched between the high $H_k$ layer 30 and the low $H_k$ layer 32. The non-magnetic layer 34 may also be electrically insulating, if desired; a 200 Å layer of $Al_2O_3$ is one such type of layer.

To avoid erroneous operation, the non-magnetic layer 34 must not be thick enough to appear to be a gap 18. However, the primary consideration dictating the thickness of the non-magnetic layer 34 is the need to achieve the desired type of coupling between the two magnetic layers 30 and 32. As previously mentioned, the two layers 30 and 32 must be decoupled in terms of internal domain flux, that is, the flux inherent in their domain structures. In other words, the thickness of the non-magnetic layer 34 is chosen such that the two magnetic layers 30 and 32 assume a domain pattern which is essentially the same as if they were not proximate to each other. However, layers 30 and 32 must be coupled in terms of external signal flux, that is, the far-field flux applied to the pole by outside forces such as the coils 24 or the disk 20. This can be accomplished by suitable thickness of the layer 34, since the magnitude of the domain flux is typically on the order of 10 kilo-gauss, and the signal flux is on the order of 1 Oersted.

Figure 2C:
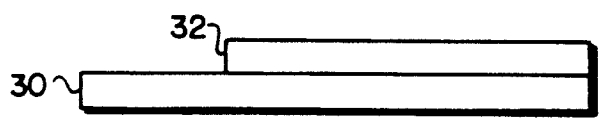

FIG. 2C is a cross sectional view of another embodiment of the lower pole 12b. We refer to this as a sculpted pole, since the high $H_k$ layer 30 is only partially covered by the low $H_k$ layer 32, to the extent of the yoke 16. A non-magnetic layer is not necessary in this arrangement, since the absence of the low $H_k$ layer 32 in the area of the tip 12 provides inherent isolation.

Figure 2D:
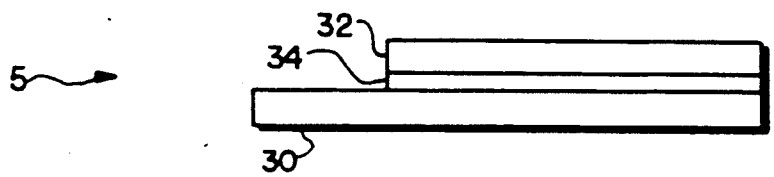

FIG. 2D is a cross sectional view of a sculpted pole embodiment similar to that of FIG. 2C, but having a non-magnetic layer 34 which is co-extensive with the low $H_k$ layer 32 in the yoke 16. This embodiment may be used wherever additional isolation is required.

Figure 2E:
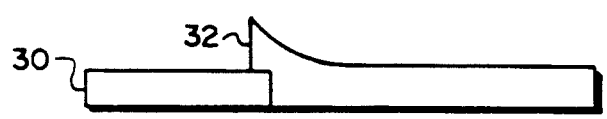

FIG. 2E shows yet another variation. Here, the high $H_k$ layer 30 is placed in the vicinity of the tip 14 only. The low $H_k$ layer 32 forms the yoke 16, and extends slightly into the tip 14, over the high $H_k$ layer 30. This embodiment also eliminates the need for a non-magnetic layer.

The embodiments depicted in FIGS. 2C, 2D and 2E all provide the same advantages as the FIG. 2B embodiment, while also providing a mechanism for eliminating the false gap problem sometimes experienced with a non-magnetic layer 34 which extends into the tip 14. However, this is achieved at the expense of a more complicated fabrication process, which must mask various areas of the layers to achieve the specific desired shapes.

Figure 3A:
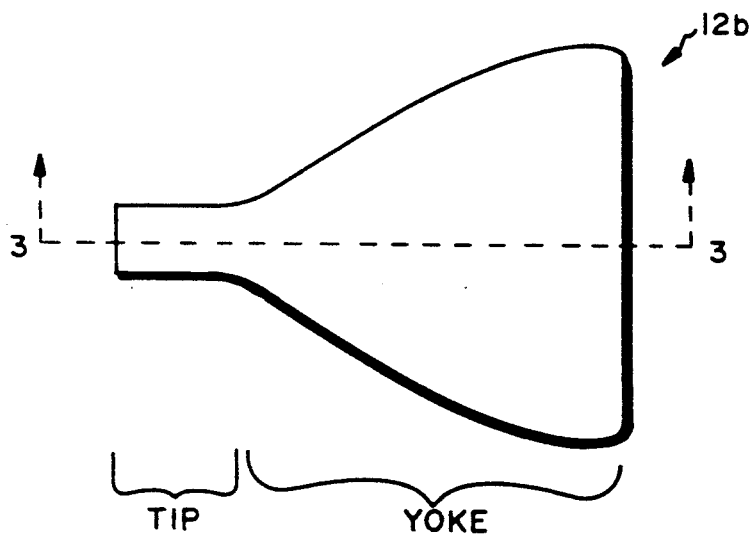
FIG. 3A is a plan view of the lower pole having a laminated high $H_k$ layer.

FIG. 3A is plan view of the lower pole 12b showing section lines 3—3 along which the views of FIGS. 3B-3E are taken.

FIGS. 3B-3E depict various embodiments of the invention wherein the two layers are a laminated layer 33 and a homogeneous layer 35. Laminated pole structures are the subject of a co-pending United States patent application entitled "Laminated Poles for Recording Heads", Ser. No. 07/128,866 filed Dec. 4, 1987 which was continued as Ser. No. 07/410,028, filed Sept. 20, 1989 now U.S. Pat. No. 5,108,837 and assigned to Digital Equipment Corporation, which should be referred to for more details.

Figure 3B:
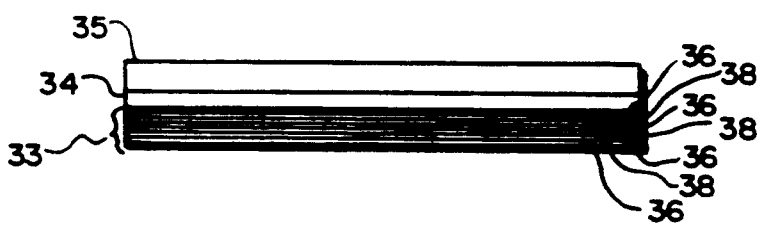

As shown in FIG. 3B, the laminated layer 33 consists of plurality of magnetic conductive films 36 and insulating films 38 alternately disposed upon one another. The magnetic conductive films are fabricated from any convenient NiFeCo alloy, and the insulating films 38 from an insulating material such as $Al_2O_3$ The homogeneous, or unlaminated layer 35 disposed adjacent the laminated layer 33 provides flux spreading along domain walls in the yoke 14 and additional conductance down the longer axis of the pole 12b.

Figure 3C:
Figure 3D:
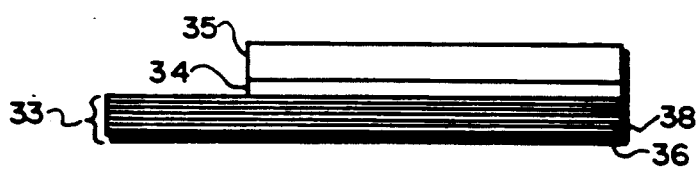
Figure 3E:
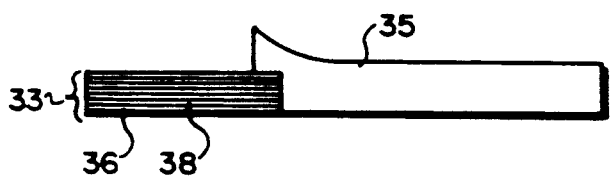

FIGS. 3C, 3D, and 3E, respectively, depict the laminated layer embodiment using a sculpted pole without a non-magnetic layer 34, a sculpted pole with a non-magnetic layer 34, and an embodiment using overlapping layers 33 and 35.

The laminated layer 33 has intrinsically high magnetic permeability, μ, since its magnetization domains close in upon themselves. This also achieves suppression of eddy currents by means of the multiple laminations, and hence enhanced high frequency performance.

Figure 4:
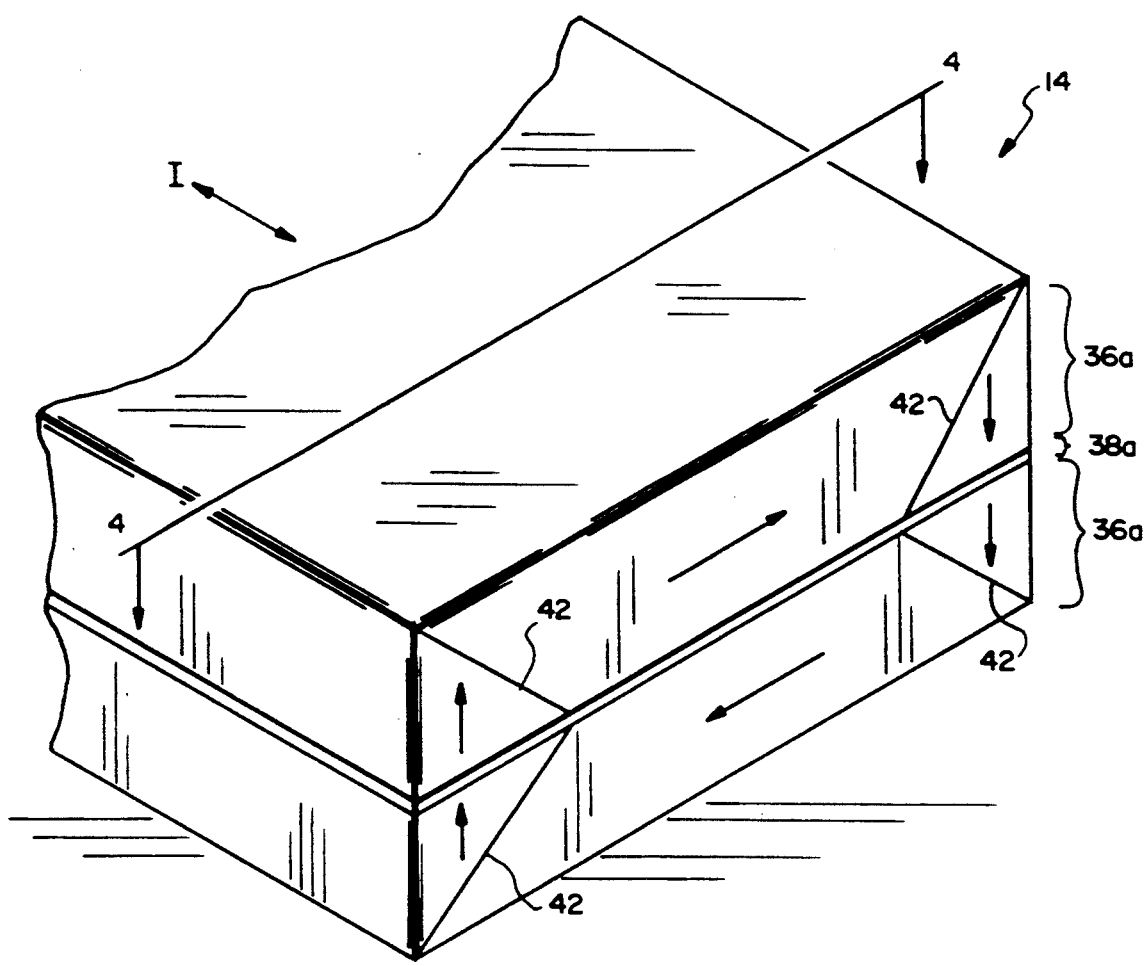
FIG. 4 is an isometric view of a laminated layer showing the orientation of various magnetic domains.

This is evident from consideration of FIG. 4, which shows the orientation of magnetic domains in the laminated layer 33. An upper conductive film 36a is positioned above an insulating film 38a which, in turn, is above a lower conductive film 36b. Edge curling walls 42 are formed via magnetostatic and exchange coupling about the periphery of the pole 12, thereby providing conductive paths at the outside edges. A given cross section of the laminated layer 33, such as along plane 4—4, thus has a region of closure. For example, a domain is provided in the "right" direction by the upper conductive film 36a, in the "down" direction by the right-edge domain, in the "left" direction by the lower conductive film 36b, and in the "up" direction by the left-edge domain. A high-permeability axis for conduction is thus provided in the direction I of desired flux conduction.

In other words, since the laminated embodiment provides domains of closure with the correct orientation, magnetic flux conduction will inherently occur by magnetization rotation, rather than by wall motion. Thus, this structure has intrinsically high permeability, and there is less of a need to use high $H_k$ material for narrow track heads.

Figure 5A:
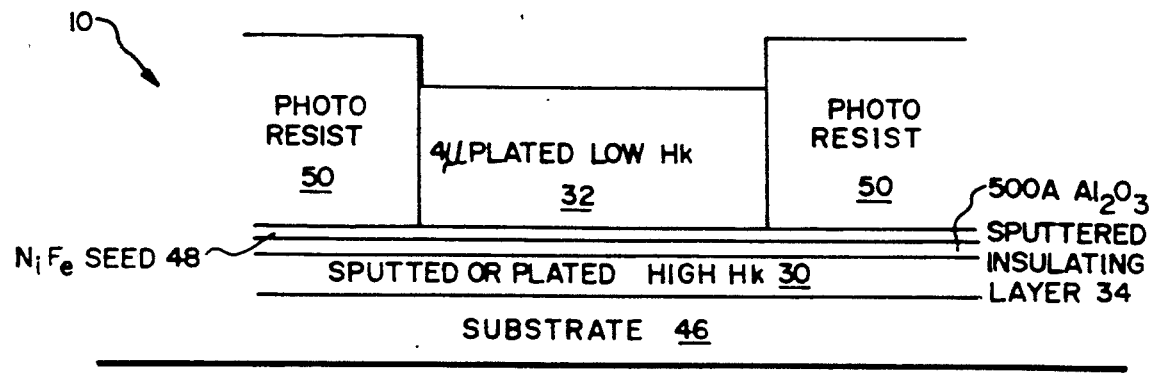
FIGS. 5A and 5B depict the preferred manner of fabricating certain portions of the homogeneous embodiment of the head.
Figure 5B:
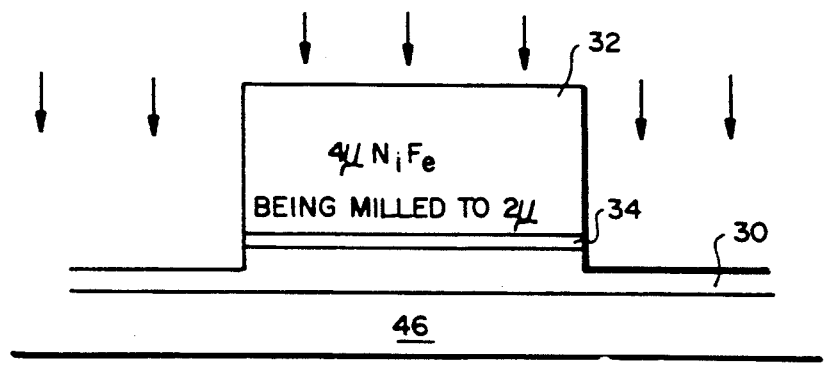

FIGS. 5A and 5B depict the homogenous sculpted embodiment of the lower pole 12b in certain stages of fabrication, as viewed in the direction 5 of FIG. 2D. The lower pole 12b is constructed by first plating or sputtering approximately 2 μm of high $H_k$ material, such as $Ni_xFe_yCo_z$, onto a substrate or wafer 46 to form the high $H_k$ layer 30. The wafer 46 is typically formed from an alsimag composite material. Alsimag is a trademark of 3M Corporation of Minneapolis, Minn. for its composite ceramic materials formed of $Al_2O_3$ and titanium carbide. A 500 Å $Al_2O_3$ non-magnetic layer 34 is sputtered on, followed by sputtering a seed layer 48 of low $H_k$ material, such as $Ni_uFe_vCo_w$. Photoresist 50 is then applied to define and expose only the yoke 16, and then approximately 4 μm of $Ni_uFe_vCo_w$ is plated to complete the low $H_k$ layer 32. The photoresist 50 is then removed.

The next step, as shown in FIG. 5B, is to ion mill the entire pole 12b to remove about 2 μm of material. This separates the pole 12b from other poles formed on the wafer 46, and reduces the thickness of the low $H_k$ layer 32 to the desired 2 μm, all in one step.

A variation on this technique which requires less processing to achieve the same result (i.e., two layers having different $H_k$'s separated by a non-magnetic, electrically insulating layer) is as follows. The high $H_k$ layer 30, the non-magnetic layer 34, and the plating seed layer 48 are sheet-deposited in a vacuum (e.g. by sputtering, evaporation, etc.). The low $H_k$ layer 32 is then plated through a mask at an excess thickness. After stripping the mask, the extra-thick upper layer 32 is itself is used as a mask to ion mill its geometry into the bottom layer 30. The excess thickness is chosen such that the desired final thickness of the top layer 32 is achieved when the ion beam etch processing of the lower layer 30 is complete.

A third variation requiring even less processing can be used, especially when a insulating spacer layer is not required. In this approach, the high $H_k$ layer 30 of $Ni_xFe_yCo_z$ is plated through a mask onto a seed layer 48. Next, if desired, a thin (e.g. 500 Å) non-magnetic layer 34 is plated through the same mask onto the bottom $Ni_xFe_yCo_z$ layer. Finally, the upper $Ni_uFe_vCo_w$ layer 32 is plated through the same mask. The mask is stripped and the seed layer 48 is removed by etching.

To fabricate the sculpted embodiment of FIG. 2D, $Ni_uFe_vCo_w$ can be first plated through a mask onto a seed layer 48 to form a layer that extends throughout the yoke 16 but not into the tip 14. The mask then stripped, and the non-magnetic layer 34 and a seed layer are vacuum-deposited. A second mask is formed that exposes the yoke 16 and tip 14 regions, and a $Ni_xFe_yCo_z$ layer is plated on top of the $Ni_uFe_vCo_w$ layer. The mask is stripped and the seed and non-magnetic layers are then etched away.

A variation on the sculpting process that requires less processing may or may not use a thin non magnetic conductive spacer layer between the two NiFeCo alloy layers. In the yoke region only, a low $H_k$, $Ni_uFe_vCo_w$ alloy is plated through a mask onto a seed layer. A non-magnetic layer may or may not be plated through the same mask onto the $Ni_uFe_vCo_w$ layer. The mask is then re-exposed and re-developed in order to open a window in the tip region 14. The high $H_k$, $Ni_xFe_yCo_z$ layer is then plated, the mask is stripped, and the seed layer is etched to complete the pole 12.

Figure 6A:
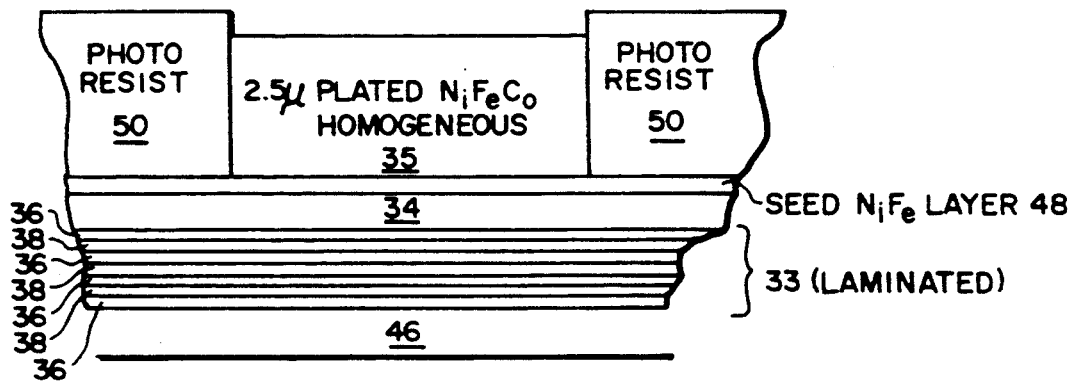
FIGS. 6A and 6B depict the preferred manner of fabricating certain portions of the laminated embodiment of the head.
Figure 6B:
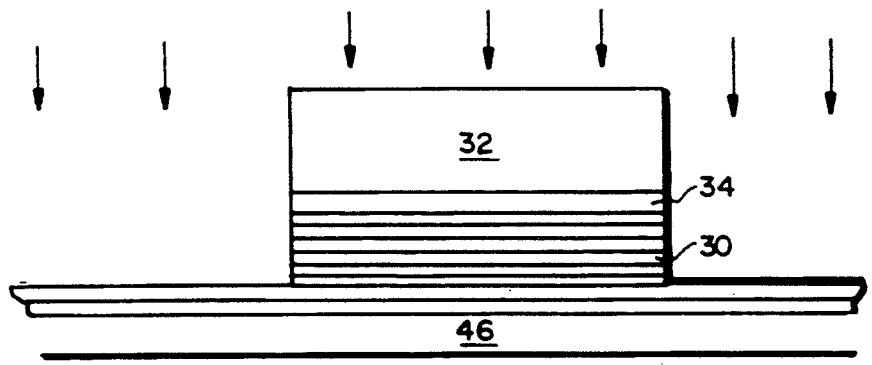

Processing for the laminated embodiment, as shown in FIGS. 6A and 6B, is quite similar. However, the laminated layer 33 is produced by alternately sputter-depositing about 100–1000 angstroms (Å), of NiFeCo alloy as a conductive film 36 and 10–100 (Å) of $Al_2O_3$ as an insulating film 38 until a total thickness of about 1–2 μm is reached. At this point, if the non-magnetic layer 34 is desired, a thicker 150–500 Å $Al_2O_3$ layer is sputter deposited. This is followed by sputtering a thin NiFeCo alloy film which serves as a seed for subsequent plating of a 2–4 μm thick, homogeneous layer 35. There are no other major process step variations, other than this sequence of alternate sputtering of materials to form the laminated layer 33.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

We claim:

1. A process for fabricating a magnetic recording head, the head including at least one pole member having a tip portion and a yoke portion, the process of fabricating the pole comprising the steps of laying down, onto a substrate, in succession:
    a first flux-conductive layer of a high anisotropy ($H_k$) and low permeability (μ) material;
    a non-magnetic, electrically insulating material layer for preventing domain flux coupling in the tip portion; and
    a second flux-conductive layer having low $H_k$ and high μ.

2. A process as in claim 1 wherein the first flux-conductive layer is formed to extend from the tip to the yoke.

3. A process as in claim 1 wherein the electrically insulating layer is formed to extend from the tip to the yoke.

4. A process as in claim 1 wherein the second flux-conductive layer is formed to extend from the tip to the yoke.

5. A process as in claim 1 wherein the second flux-conductive layer is formed to extend only into the yoke.

6. A process as in claim 5 wherein the electrically insulating layer is formed to extend only into the yoke.

7. A process as in claim 1 wherein the first flux-conductive layer is formed as a homogeneous layer of a high $H_k$ material.

8. A process as in claim 1 wherein the first flux-conductive layer is formed by plating.

9. A process as in claim 1 wherein the first flux-conductive layer is formed by sputtering.

10. A process as in claim 1 wherein the non-magnetic, electrically insulating layer is formed by plating.

11. A process as in claim 1 wherein the non-magnetic, electrically insulating layer is formed by sputtering.

12. A process as in claim 1 wherein the second flux-conductive layer is formed by plating.

13. A process as in claim 1 wherein the second flux-conductive layer is formed by sputtering.

14. A process for fabricating a magnetic recording head for use with a magnetic recording media, the head including at least one pole member having a tip portion and a yoke portion, and the of fabricating a pole comprising, in order, the steps of:

alternately sputtering films of a magnetic conductive material and a magnetic insulating material to provide a first flux-conductive layer having intrinsically high permeability ($\mu$);

sputtering a non-magnetic, electrically non-conductive material layer that prevents domain flux coupling in the tip portion;

sputtering a seed layer of conductive material; and plating a second flux-conductive layer having high $H_k$ and low $\mu$.

15. A process as in claim 14 wherein the first flux-conductive layer is formed to extend from the tip to the yoke.

16. A process as in claim 15 wherein the second flux-conductive layer is plated to extend only into the yoke.

17. A process as in claim 14 wherein the non-magnetic, electrically non-conductive material layer is plated to extend from the tip to the yoke.

18. A process as in claim 14 wherein the second flux-conductive layer is plated to extend from the tip to the yoke.

19. A process as in claim 14 wherein the non-magnetic, electrically non-conductive material layer is plated to extend only into the yoke.

* * * * *